(12) United States Patent
Chor

(10) Patent No.: US 8,438,245 B2
(45) Date of Patent: May 7, 2013

(54) REMOTE APPLICATION INVOCATION SYSTEM AND METHOD

(75) Inventor: Jesse Chor, Bellevue, WA (US)

(73) Assignee: MSKYNET Inc., Seattle, WA (US)

( * ) Notice: Subject to any disclaimer, the term of this patent is extended or adjusted under 35 U.S.C. 154(b) by 317 days.

(21) Appl. No.: 12/852,730

(22) Filed: Aug. 9, 2010

(65) Prior Publication Data

US 2012/0036225 A1 Feb. 9, 2012

(51) Int. Cl.
*G06F 15/16* (2006.01)
(52) U.S. Cl.
USPC .......................................... 709/219; 709/203
(58) Field of Classification Search .................... 709/219
See application file for complete search history.

(56) References Cited

U.S. PATENT DOCUMENTS

| | | | | | |
|---|---|---|---|---|---|
| 4,263,504 | A | * | 4/1981 | Thomas | 235/454 |
| 5,773,806 | A | * | 6/1998 | Longacre, Jr. | 235/462.1 |
| 6,533,168 | B1 | * | 3/2003 | Ching | 235/375 |
| 6,830,197 | B2 | * | 12/2004 | Rubin et al. | 235/494 |
| 6,993,594 | B2 | * | 1/2006 | Schneider | 709/245 |
| 7,117,227 | B2 | * | 10/2006 | Call | 709/219 |
| 7,382,258 | B2 | * | 6/2008 | Oldham et al. | 340/572.1 |
| 7,693,744 | B2 | * | 4/2010 | Forbes | 705/14.64 |
| 7,908,272 | B2 | * | 3/2011 | Chang et al. | 707/736 |
| 8,139,250 | B2 | * | 3/2012 | Honda et al. | 358/1.15 |
| 8,149,111 | B2 | * | 4/2012 | Monroe | 340/539.12 |
| 8,238,951 | B2 | * | 8/2012 | McGary | 455/466 |
| 2002/0158127 | A1 | * | 10/2002 | Hori et al. | 235/454 |
| 2006/0184617 | A1 | * | 8/2006 | Nicholas et al. | 709/203 |
| 2008/0189360 | A1 | * | 8/2008 | Kiley et al. | 709/203 |
| 2009/0233648 | A1 | * | 9/2009 | Shen | 455/566 |
| 2010/0034468 | A1 | * | 2/2010 | Boncyk et al. | 382/217 |
| 2010/0313250 | A1 | * | 12/2010 | Chow | 726/5 |
| 2011/0139867 | A1 | * | 6/2011 | Meyer | 235/375 |
| 2011/0179113 | A1 | * | 7/2011 | Thomas | 709/203 |
| 2011/0202582 | A1 | * | 8/2011 | Kim et al. | 707/827 |
| 2011/0246284 | A1 | * | 10/2011 | Chaikin et al. | 705/14.38 |
| 2011/0258443 | A1 | * | 10/2011 | Barry | 713/168 |
| 2012/0027301 | A1 | * | 2/2012 | Schloter et al. | 382/181 |
| 2012/0044059 | A1 | * | 2/2012 | Saros et al. | 340/10.5 |
| 2012/0101941 | A1 | * | 4/2012 | Kang et al. | 705/40 |
| 2012/0138671 | A1 | * | 6/2012 | Gaede et al. | 235/375 |

FOREIGN PATENT DOCUMENTS

CH 700008 B1 * 6/2010

OTHER PUBLICATIONS

QR Code, Wikipedia Entry, Aug. 9, 2012, pp. 1-15.*
Liu, Yue. "Recognition of QR Code with Mobile Phones," Chinese Control and Decision Conference (CCDC), Jul. 4, 2008, pp. 203-206.*

(Continued)

*Primary Examiner* — Lynn Feild
*Assistant Examiner* — Melvin H Pollack
(74) *Attorney, Agent, or Firm* — ÆON Law; Adam L. K. Philipp

(57) ABSTRACT

A server generates a unique URL corresponding to a data payload, provides that unique URL for exposure (via a machine-scannable code) to mobile devices of different types, and when the server receives a request for the unique URL from a mobile device, the server uses a payload-type to mobile-device-type mapping to generate a device-type-specific URI that includes the data payload, formatted for the device type. The server delivers the device-type-specific URI to the mobile device to invoke a non-web-browser application for handling the data payload.

18 Claims, 12 Drawing Sheets

OTHER PUBLICATIONS

Gao, J. Z. "Understanding 2D-BarCode Technology and Applications in M-Commerce—Design and Implementation of a 2D Barcode Processing Service," Computer Software and Applications Conference (COMPSAC), Jul. 27, 2007, pp. 49-56.*

Tarassenko, V. "Means of Transforming, Storing and Inputting Data Represented as Multicolor Matrix Barcodes," Proceedings of the 7th Intl. Conference. The Experience of Designing and Application of CAD Systems in Microelectronics (CADSM), Feb. 22, 2003, pp. 486-489.*

Moravec, K.L.C. "A Grayscale Reader for Camera Images of Xerox Dataglyphs," Proceedings of the British Machine Vision Conference, 2002, pp. 698-707.*

Rouillard, J. "Contextual QR Codes," The Third International Multi-Conference on Computing in the Global Information Technology (ICCGI), Aug. 1, 2008, pp. 50-55.*

Ohcubhi, E. "Barcode Readers Using the Camera Device in Mobile Phones," Intl. Conference on Cyberworlds, Nov. 20, 2004, pp. 260-265.*

Muniz, R. et al. "A Robust Software Barcode Reader Using the Hough Transform," Proceedings Intl Conference on Information Intelligence and Systems, 1999, pp. 313-319.*

Rekimoto, J. "Matrix: A Realtime Object Identification and Registration Method for Augmented Reality," Proceedings, 3rd Asia Pacific Computer Human Interaction, Jul. 17, 1998, pp. 63-68.*

* cited by examiner

REMOTE APPLICATION INVOCATION SYSTEM AND METHOD

FIELD

The present disclosure relates to mobile computing devices, and more particularly to invoking applications on remote mobile computing devices via machine-scannable codes.

BACKGROUND

The term "mobile tagging" refers to the process of providing data to mobile devices, commonly through the use of data (e.g., a Uniform Resource Locator or "URL") encoded in a two-dimensional barcode. For example, addresses and/or URLs are commonly encoded in two-dimensional barcodes (e.g., QR Codes, Data Matrix codes, High Capacity Color Barcodes or "HCCBs," and the like) that are printed in magazines, on signs, buses, business cards, or other object. Users with a camera phone equipped with an appropriate reader application can scan the image of the two-dimensional barcode to display text, contact information, connect to a wireless network, open a webpage in the phone's browser, and/or perform other operations. For example, the Android operating system for mobile devices (provided by Google Inc. of Menlo Park, Calif.) supports the use of QR codes by natively including a barcode scanner application on some device models and by including a browser that supports Uniform Resource Identifier ("URI") redirection, which allows QR Codes to send metadata to existing applications on the device. The Symbian OS (provided by Nokia Corporation of Tempere, Finland) also includes a barcode scanner that is able to read QR Codes.

Generally speaking two-dimensional barcodes encode some sort of actionable text (or other data). For example, text representing contact information, when recognized by a barcode scanner application, could add the contact information to an address book on the device. Similarly, text representing an event or appointment, when recognized, could add the event or appointment to a calendar on the device; text representing geo-location information, when recognized, could open a map application on the device; and so on.

However, actionable text, such as the examples mentioned above, can only be acted on when the barcode scanner application understands the format of the actionable text encoded in the two-dimensional barcode. Some format standards exist and are commonly used for encoding actionable text in a two-dimensional barcode. For example, perhaps the most common actionable text encoded in two-dimensional barcodes is text that represents a URL, e.g. "http://google.com/m". This string of text would be generally recognized as a URL by virtually all barcode scanner applications, and the resulting action would typically be to open the URL in a browser application on the device.

However, not all actionable text formats are so universally recognizable, and many different mobile device manufacturers and/or mobile device operating system providers may implement proprietary standards for formatting actionable text in two-dimensional barcodes. For example, mobile devices provided by NTT DoCoMo, Inc. of Tokyo, Japan may recognize URLs encoded using an alternate format, e.g. "MEBKM:TITLE:NTT DOCOMO;URL:http¥://i.nttdocomo.co.jp/f/;". While mobile devices provided by NTT DoCoMo may recognize such a URI, other types of mobile device may not recognize such a URI.

Similarly, differing formal and/or de-facto standards may be used by different types of mobile devices for interpreting encoded contact information, event/appointment information, and other types of information. Consequently, it may be difficult or even impossible in some cases to provide a single two-dimensional barcode that will cause a variety of different types of mobile devices to perform a desired action.

In addition, different types of mobile devices may implement cameras or other scanning components that have differing capture capabilities. While various types of two-dimensional barcode may be able to encode several kilobytes (or more) of information, not all mobile devices may be able to properly recognize many densely-packed two-dimensional barcodes. For example, a first mobile device with an auto-focus macro lens may be able to capture and resolve a two-dimensional barcode encoded with several kilobytes of data, while a second mobile device, with a fixed-focus lens, may only be able to resolve as little as 200 bytes of data. Consequently, even if the first and second devices both supported the same actionable text format, the second device may still be incapable of acting on an information-dense two-dimensional barcode due to hardware limitations of the second device's capture components.

DESCRIPTION

Figure 1:
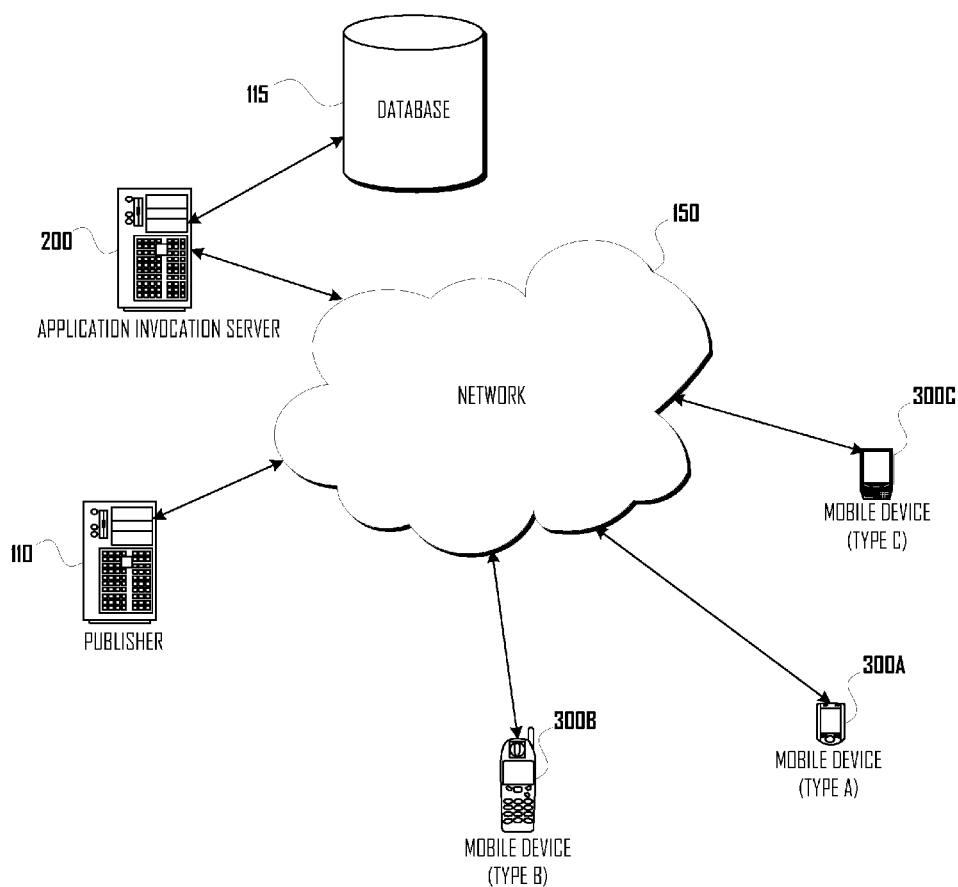
FIG. 1 illustrates an exemplary remote application invocation system according to one embodiment.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file Servers, computer Servers and memory storage devices. Each of these conventional distributed computing components is accessible by the processor via a communication network.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 illustrates an exemplary remote application invocation system 100 according to one embodiment in which mobile devices 300A-C (see FIG. 3, discussed below) and application invocation server 200 (see FIG. 2, discussed below) are connected to a network 150. In some embodiments, a publisher device 110 is also connected to network 150, and application invocation server 200 is in communication with database 115 (which may also be connected to network 150 in some embodiments). In some embodiments, publisher device 110 may also be in direct communication with application invocation server 200. In other embodiments, application invocation server 200 and publisher device 110 may comprise a single device.

In some embodiments, other servers and/or devices (not shown) may also be present. For example, in some embodiments, one or more proxy devices, firewalls, and/or other intermediaries (not shown) may exist between application invocation server 200 and some or all of clients 300A-C.

In some embodiments, application invocation server 200 may communicate with database 115 via network 150, a storage area network ("SAN"), a high speed serial bus, and/or via other suitable communication technology. In some embodiments, application invocation server 200, publisher device 110, and/or database 115 may comprise one or more replicated and/or distributed physical or logical devices.

In various embodiments, network 150 may include the Internet, a local area network ("LAN"), a wide area network ("WAN"), a cellular data network, and/or other data network. In many embodiments, there may be more mobile devices 300 than are illustrated.

Figure 2:
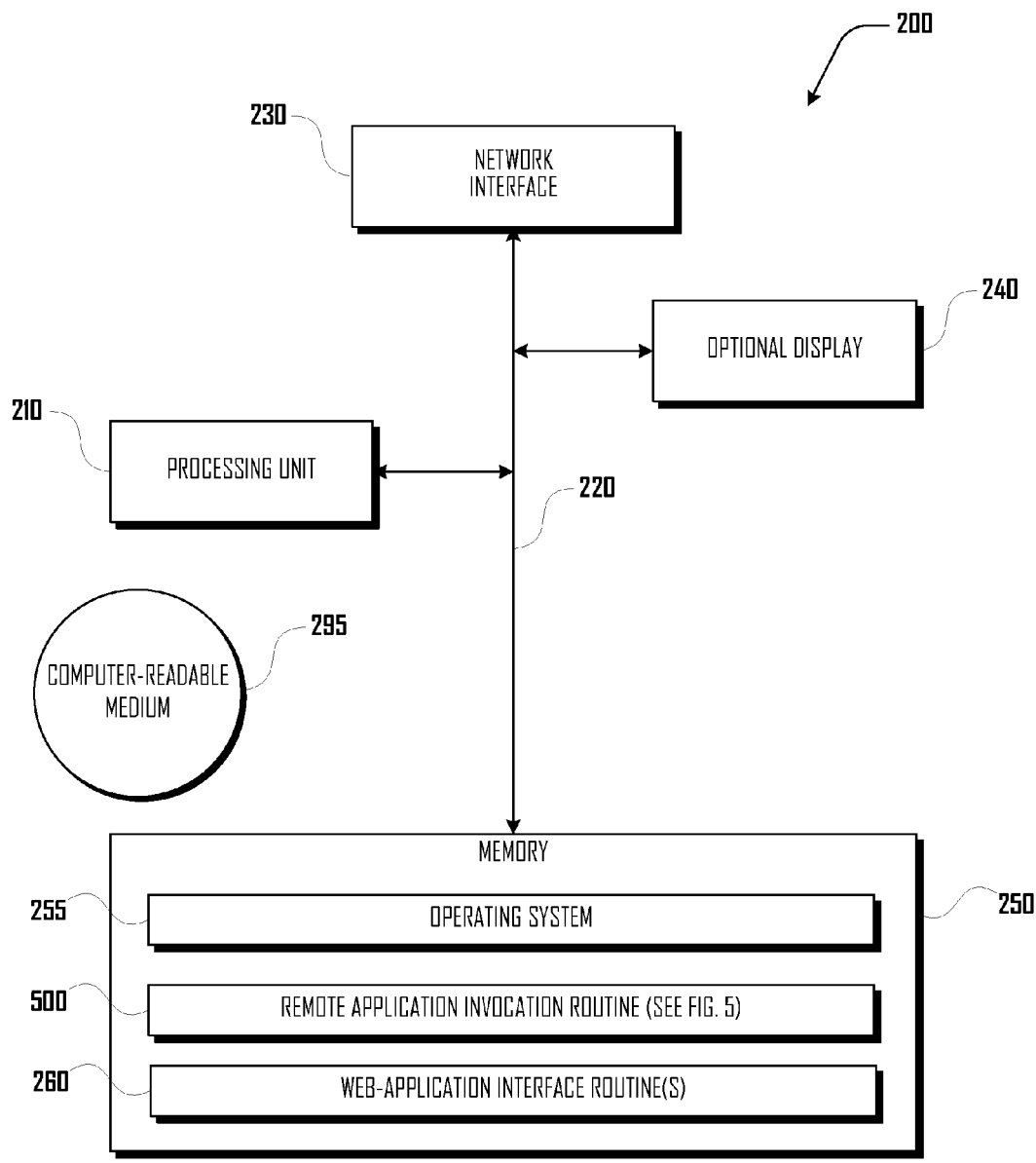
FIG. 2 illustrates several components of an exemplary application invocation server.

FIG. 2 illustrates several components of an exemplary application invocation server 200. In some embodiments, application invocation server 200 may include many more components than those shown in FIG. 2. However, it is not necessary that all of these generally conventional components be shown in order to disclose an illustrative embodiment. As shown in FIG. 2, application invocation server 200 includes a network interface 230 for connecting to the network 150.

The application invocation server 200 also includes a processing unit 210, a memory 250, and an optional display 240, all interconnected along with the network interface 230 via a bus 220. The memory 250 generally comprises a random access memory ("RAM"), a read only memory ("ROM"), and a permanent mass storage device, such as a disk drive. The memory 250 stores program code for a remote-application invocation routine 500 (see FIG. 5, discussed below) and one or more web-application interface routines 260. In addition, the memory 250 also stores an operating system 255. These software components may be loaded from a computer readable storage medium 295 into memory 250 of the application invocation server 200 using a drive mechanism (not shown) associated with a non-transient computer readable storage medium 295, such as a floppy disc, tape, DVD/CD-ROM drive, memory card, or the like. In some embodiments, software components may also be loaded via the network interface 230, rather than via a computer readable storage medium 295.

In some embodiments, application invocation server 200 may further comprise a specialized interface (not shown) for communicating with database 115, such as a high speed serial bus, or the like. In some embodiments, application invocation server 200 may communicate with database 115 via network interface 230. In other embodiments, database 115 may reside in memory 250.

Although an exemplary application invocation server 200 has been described that generally conforms to conventional general purpose computing devices, an application invocation server 200 may be any of a great number of devices capable of communicating with the network 150, database 115, and/or clients 300A-C, for example, a personal computer, a game console, a set-top box, a handheld computer, a cell phone, or any other suitable device.

Figure 3:
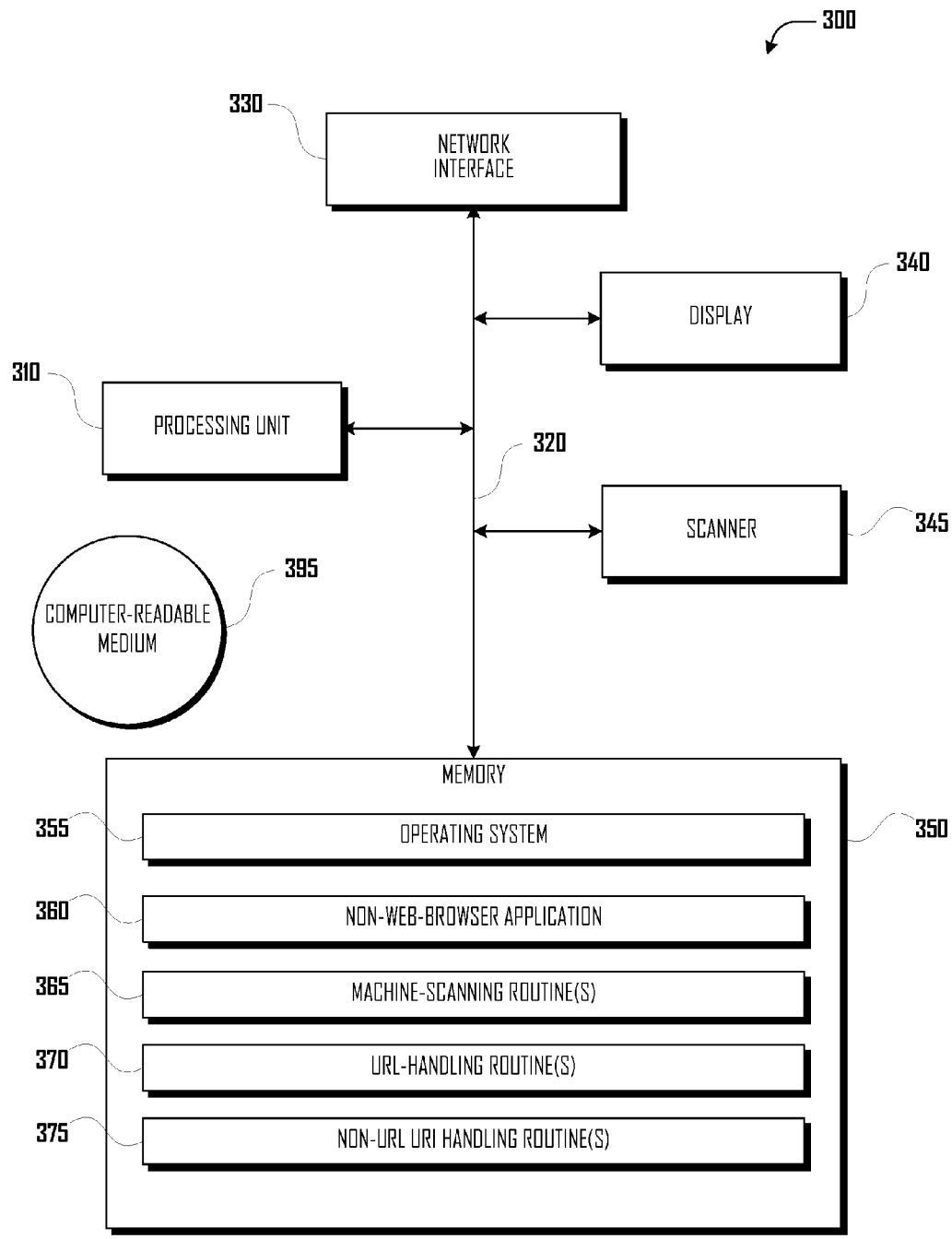
FIG. 3 illustrates several components of an exemplary mobile device.

FIG. 3 illustrates several components of an exemplary mobile device 300. In some embodiments, mobile device 300 may include many more components than those shown in FIG. 3. However, it is not necessary that all of these generally conventional components be shown in order to disclose an illustrative embodiment. As shown in FIG. 3, mobile device 300 includes a network interface 330 for connecting to the network 150.

The mobile device 300 also includes a processing unit 310, a memory 350, and a display 340, all interconnected along with the network interface 330 via a bus 320. The memory 350 generally comprises a random access memory ("RAM"), a read only memory ("ROM"), and a permanent mass storage device, such as a disk drive, flash memory, or other persistent storage technology. The memory 350 stores program code for a non-web-browser application 360, as well as one or more routines 365, 370, 375 for respectively handling machine scanning operations (including scanning, decoding, and interpreting machine-scannable codes), URL handling operations (e.g., a web browser and routines for invoking the web browser), and non-web-browser URI handling operations (e.g., one or more non-web-browser applications and routines for invoking the non-web-browser applications). In addition, the memory 350 also stores an operating system 355. These software components may be loaded from a computer readable storage medium 395 into memory 350 of the mobile device 300 using a drive mechanism (not shown) associated with a non-transient computer readable storage medium 395, such as a floppy disc, tape, DVD/CD-ROM drive, memory card, or the like. In some embodiments, software components may also be loaded via the network interface 330, rather than via a computer readable storage medium 395.

The mobile device 300 also includes a scanner 345 capable of capturing information encoded in machine-scannable codes. For example, in some embodiments, scanner 345 may comprise a camera or other optical scanner for capturing optically-encoded machine-scannable codes, such as barcodes, two-dimensional barcodes, and the like. In other embodiments, scanner 345 may comprise a radio transmitter and/or receiver for capturing radio-frequency identification ("RFID") tags and the like. In still other embodiments, scanner 345 may comprise suitable components for scanning or reading codes encoded in other machine-scannable media Although an exemplary mobile device 300 has been described that generally conforms to conventional general purpose computing devices, an mobile device 300 may be any of a great number of devices capable of communicating with the network 150 and/or application invocation server 200, for example, a personal computer, a game console, a set-top box, a handheld computer, a cell phone, or any other suitable device.

Figure 4:
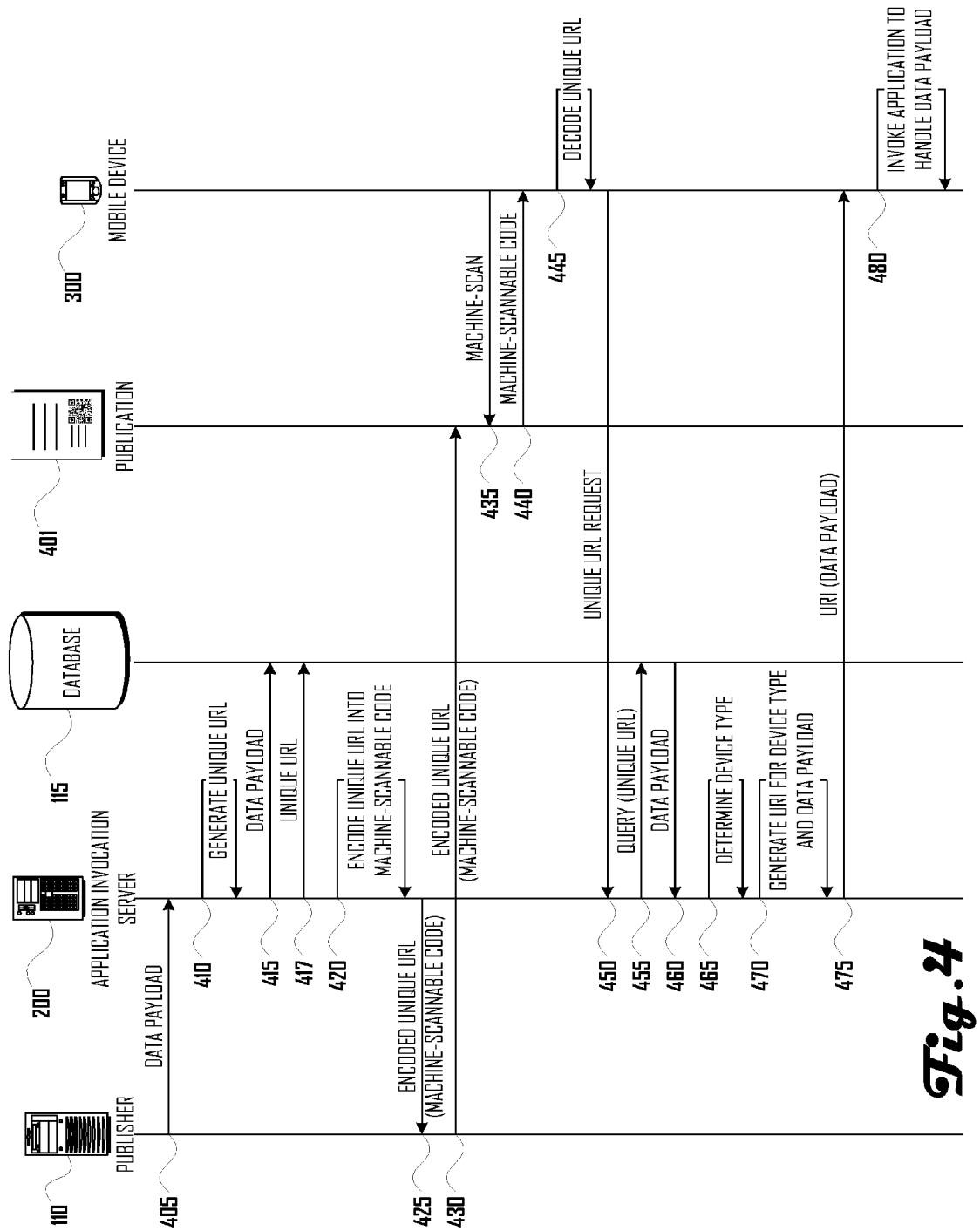
FIG. 4 illustrates an sequence of data communications for an exemplary remote-application invocation scenario, in accordance with one embodiment.

FIG. 4 illustrates an sequence of data communications for an exemplary remote-application invocation scenario, in accordance with one embodiment. Publisher 110 has an actionable data payload for exposure, via a machine-scannable code, to at least one mobile device 300 from among a number of mobile devices (not shown) of differing mobile device types. The actionable payload should invoke a non-web-browser application on the differing mobile device types, and the differing mobile device types require differing URI formats to invoke the intended non-web-browser application.

For example, in various embodiments, the actionable data payload may include information such as contact information (for invoking address book or contact manager applications on the differing mobile device types), geo-location information (for invoking geo-mapping applications on the differing mobile device types), event information (for invoking calendar or appointment applications on the differing mobile device types), downloadable content information (for invoking store or e-commerce applications on the differing mobile device types), and the like. In some embodiments, the actionable data payload may include one kilobyte or more of data, but mobile device 300's scanner may not be capable of resolving more than about 200 bytes of data.

Publisher 110 sends actionable data payload 405 to application invocation server 200, which generates 410 a unique URL associated with the data payload. Application invocation server 200 stores 415, 417 in database 115 the data payload and the unique URL associated with the data payload.

In some embodiments, the actionable data payload may include one kilobyte or more of data and may thus be too large to encode into a machine-scannable code than can be reliably scanned by mobile devices with relatively low-fidelity scanner components (e.g., cameras with fixed-focus lenses). In such embodiments, the unique URL may consist of far less data than the actionable data payload. For example, in one embodiment, the unique URL may consist of 20 (or even fewer) characters. In many embodiments, the unique URL may consist of less than about 200 bytes of data, so that when the unique URL is encoded into a machine-scannable code (e.g., a two-dimensional barcode), the machine-scannable code will not contain more information than can be reliably captured by mobile device types with relatively low-fidelity scanner components.

In the illustrated embodiment, application invocation server 200 encodes 420 the unique URL into a machine-scannable code and sends 425 to publisher 110 the machine-scannable code with the encoded unique URL. For example, in one embodiment, application invocation server 200 may encode the unique URL into a two-dimensional barcode and send an image of the barcode to publisher 110. In other embodiments, application invocation server 200 may send the unencoded unique URL directly to publisher 110, in addition to or instead of the machine-scannable code. In some embodiments, publisher 110 may perform the encoding of the unique URL into the machine-scannable code. For example, in one embodiment, publisher 110 may receive the unique URL and encode it into one or more RFID rags.

Publisher 110 manifests 430 the machine-scannable code (encoded with the unique URL) into at least one publication 401. In some embodiments, publication 401 may comprise one of a run of printed publications, such as a magazines, flyers, brochures, catalogs, books, and the like. In such embodiments, manifesting the machine-scannable code into publication 401 may comprise printing (or causing to be printed) an image of the machine-scannable code on one or more pages of the printed publication. In other embodiments, publication 401 may comprise an electronic publication, such as a web page, e-mail message(s), instant message(s), and the like. In such other embodiments, manifesting the machine-scannable code into publication 401 may comprise including an image of the machine-scannable code (or a link to such an image) within the content of an electronic document, such as an HyperText Markup Language ("HTML") document. In still other embodiments, publication 401 may comprise an article of manufacture, in which case manifesting the machine-scannable code into publication 401 may comprise affixing an RFID (encoded with the unique URL) to the article of manufacture.

At some point, mobile device 300 encounters publication 401 and machine-scans 435 the machine-scannable code manifested therein. For example, in some embodiments, mobile device 300 may capture a picture of a machine-scannable code printed on a page of publication 401 or rendered as an electronic document on a display of a display device. In other embodiments, mobile device 300 may capture data emanating from an RFID tag affixed to publication 401. As discussed above, in some embodiments, the machine-scannable code may encode only about 20-200 bytes of data, so the machine-scannable code may be relatively easily scannable even if mobile device 300 has relatively low-fidelity scanner components.

Having obtained 440 a representation of the machine-scannable code manifested in publication 401, mobile device 300 decodes 445 the unique URL encoded in the machine-scannable code, and sends 450 a request for the unique URL to application invocation server 200.

Application invocation server 200 queries 455 database 115 and retrieves 460 the actionable data payload associated with the unique URL. Application invocation server 200 also determines a device type of mobile device 300. For example, in one embodiment, the request for the unique URL from mobile device 300 may include an implicit indication of the client type (e.g., a client hardware and/or software type may be indicated via an HTTP referrer header or other metadata incident to the request). In other embodiments, determining a device type of mobile device 300 may include additional communications (not shown) with mobile device 300.

Having determined a device type of mobile device 300, application invocation server 200 generates a URI including the actionable data payload, the URI being formatted so that mobile device 300 will be able to interpret and act on the data payload by invoking a non-web-browser application.

Because the URI is to invoke a non-web-browser application, in some embodiments, the URI may not be a URL (URLs being a subset of URIs). However, some device types may handle some URLs (as well as non-URL URIs) by non-web-browser applications. For example, iPhone OS/iOS devices (provided by Apple Inc. of Cupertino, Calif.) may handle URLs in the form of "http://maps.google.com/maps . . . " by invoking the Maps non-web-browser application (if present), while URLs in the form of "http://phobos.apple.com/WebObjects . . . " may be handled by the iTunes non-web-browser application.

In some embodiments, generating such a device-type-specific URI includes obtaining and using a device-type/payload-type mapping, as discussed below. In some embodiments, the generated device-type-specific URI may comprise one kilobyte or more of data.

Application invocation server 200 sends 475 the device-type-specific URI to mobile device 300, which invokes 480 an appropriate non-web-browser application to handle the data payload. In other embodiments, an equivalent result may be obtained by generating and delivering an alternately-formed device-type-specific data structure in place of the device-type-specific URI, e.g. device-type-specific Extensible Markup Language ("XML") data, device-type-specific JavaScript Object Notation ("JSON") data, and the like.

Figure 5:
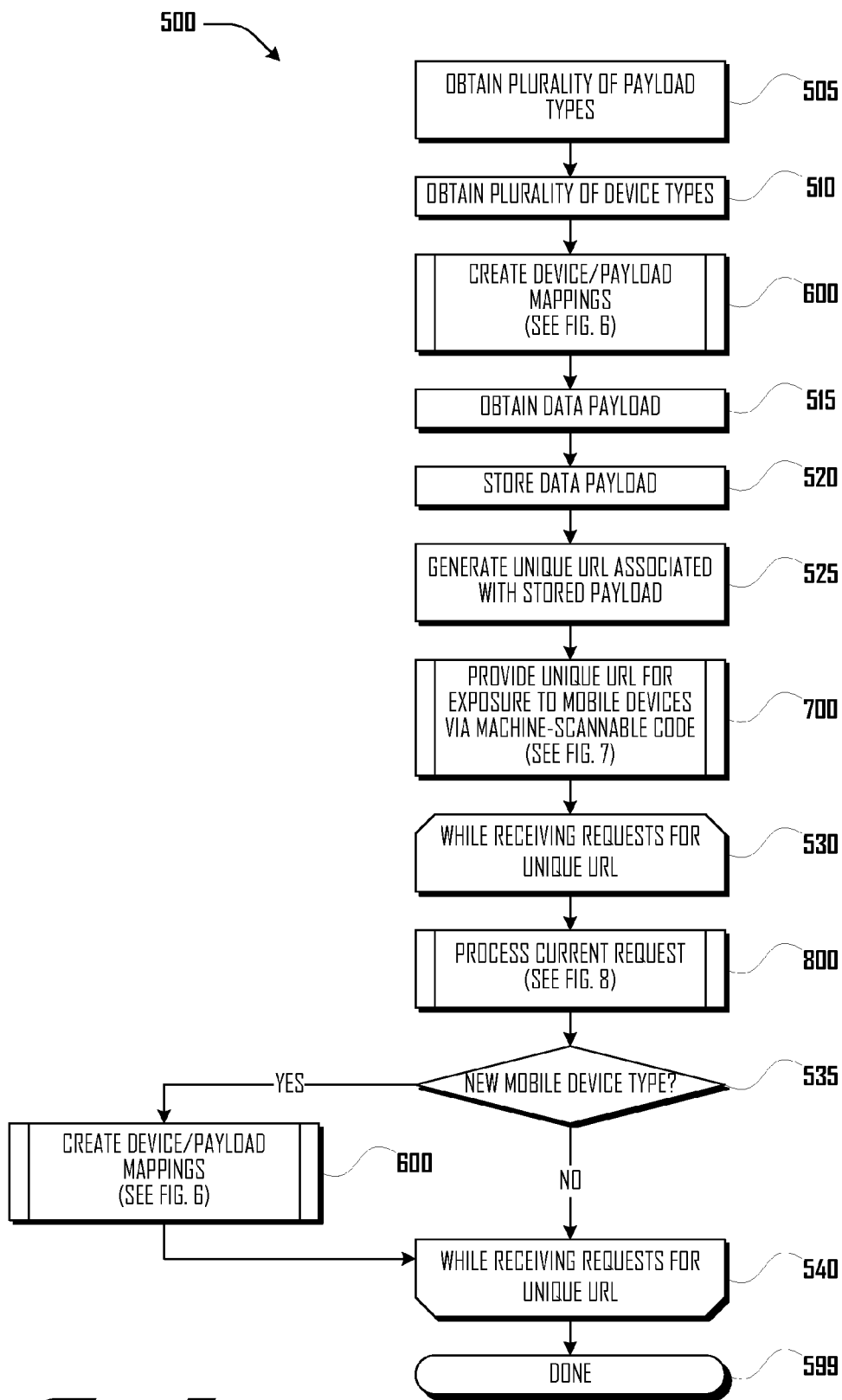
FIG. 5 illustrates a remote-application invocation routine in accordance with one embodiment.

FIG. 5 illustrates a remote-application invocation routine 500 in accordance with one embodiment. In some embodiments, routine 500 may be performed by application invocation server 200. In block 505, routine 500 obtains information related to a plurality of different payload types. For example, in one embodiment, the plurality of different payload types may include payload types such as contact information, map or geo-location information, event or appointment information, downloadable content information, and the like. The information related to the plurality of different payload types may include information such as standardized formats (if any) corresponding to the payload types, such as vCard for contact information, vCal for event/appointment information, and the like.

In block 510, routine 500 obtains information related to a plurality of different device types. For example, in one embodiment, the plurality of different device types may include device types such as the following:

- iPhone OS and/or iOS devices, provided by Apple Inc. of Cupertino, Calif.;
- Android operating system devices, provided by Google Inc. of Menlo Park, Calif.;
- BlackBerry devices, provided by Research In Motion Limited of Waterloo, Ontario;
- webOS devices, provided by Palm, Inc. of Sunnyvale, Calif.;
- Symbian OS devices, provided by Nokia Corporation of Tempere, Finland;

and the like.

In some embodiments, the information related to the plurality of different device types may also include information related to non-web-browser applications that exist on each device type for handling the different payload types, including the URL and/or URI formats that are required to invoke the non-web-browser applications on each device type.

Figure 6:
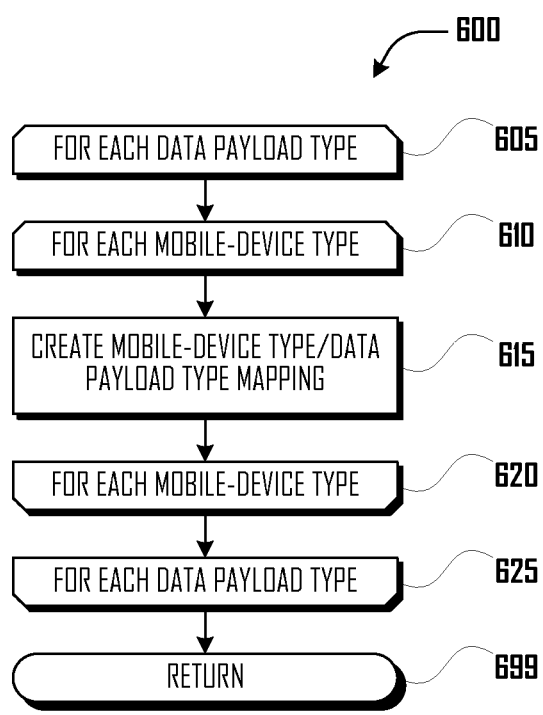
FIG. 6 illustrates an exemplary device/payload mapping subroutine, in accordance with one embodiment.

In subroutine block 600 (see FIG. 6, discussed below), routine 500 creates a set of device-type/payload-type mappings corresponding to the plurality of different payload types and the plurality of different device types. Specifically, FIG. 6 illustrates an exemplary device/payload mapping subroutine 600, in accordance with one embodiment. Beginning in starting loop block 605, subroutine 600 iterates over each data payload type, and beginning in starting loop block 610, subroutine 600 iterates over each mobile-device type. In block 615, subroutine 600 creates a mapping between the current data payload type and the current mobile-device type. For example, in one embodiment, the created mapping may indicate that for the current device/payload combination, a particular URI format should be used, including a particular URI scheme and a particular scheme-specific syntax, possibly including placeholders for various types of scheme-specific data. In ending loop block 620, subroutine 600 iterates back to block 610 to process the next mobile-device type (if any), and ending loop block 625, subroutine 600 iterates back to block 605 to process the next data payload type (if any). subroutine 600 ends in block 699, making the created mappings available to the caller.

In one embodiment, the created mappings may be comprise executable program code for handling a particular type of actionable data payload. For example, in one embodiment, mappings for combinations of geo-location data payload types and various mobile-device types may be embodied as in the following exemplary code snippet:

```
urlagent = request.env["HTTP_USER_AGENT"]
caption = map_location.caption || map_location.search_location
case urlagent
when /(iPhone|webOS)/i
    redirect_url = "http://maps.google.com/maps?q="<<
        map_location.map_query
    redirect_url << "(#{caption})" unless caption.strip.empty?
when /(Android)/i
    redirect_url = "geo:0,0?q="<<map_location.map_query
    redirect_url << "(#{caption})" unless caption.strip. empty?
else
    redirect_url = map_location.generate_map_url(request.host,
        caption)
end
redirect_to redirect_url
```

Similarly, in one embodiment, mappings for combinations of event or appointment data payload types and various mobile-device types may be embodied as in the following exemplary code snippet:

```
phone_type = MobileType.getPhoneTypeFromAgentString(
    request.env["HTTP_USER_AGENT"] )
#Parameters for generating ics file
@vcal_params = { }
case phone_type
when MobileType::IPHONE
    #Invoke native iCalendar on IPhone
    ics_url = url_for(:only_path=>true, :overwrite_params =>
        {:action=>'generate', :format=>'ics'})
    redirect_to "webcal://#{request.host_with_port}#{ics_url}"
    return
when MobileType::WINDOWS_CE
    #Create downloadable vcs file for Windows Mobile
    redirect_to :overwrite_params => {:action=>'generate',
        :format=>'vcs'}
    return
when MobileType::SYMBIAN
    #Create downloadable vcs v1.0 file for Symbian phones
    redirect_to :overwrite_params => {:action=>'generate',
        :format=>'vcs', :mobile=>phone_type}
    return
end
```

Referring again to FIG. 5, in block 515, routine 500 obtains an actionable data payload. For example, in one embodiment, routine 500 may receive the actionable data payload from a remote publisher device (e.g., publisher 110). In other embodiments, routine 500 may obtain actionable data payload from database 115 or other local or remote data store.

As discussed above, in various embodiments, the actionable data payload may include information such as contact information (for invoking address book or contact manager applications on the plurality of different device types), geo-location information (for invoking geo-mapping applications on the plurality of different device types), event information (for invoking calendar or appointment applications on the plurality of different device types), downloadable content information (for invoking store or e-commerce applications on the plurality of different device types), and the like. In some embodiments, the actionable data payload may include one kilobyte or more of data.

In block 520, routine 500 stores the actionable data payload, e.g. in database 115 or other data store. In block 525, routine 500 generates a unique URL and associates the unique URL with the stored actionable data payload. In some embodiments, the unique URL may consist of between 20-200 bytes of data. In other embodiments, the unique URL may be larger or smaller.

In subroutine block 700 (see FIG. 7, discussed below), routine 500 provides the unique URL for exposure, via a machine-scannable code, to a plurality of mobile devices of the plurality of different device types.

Figure 7:
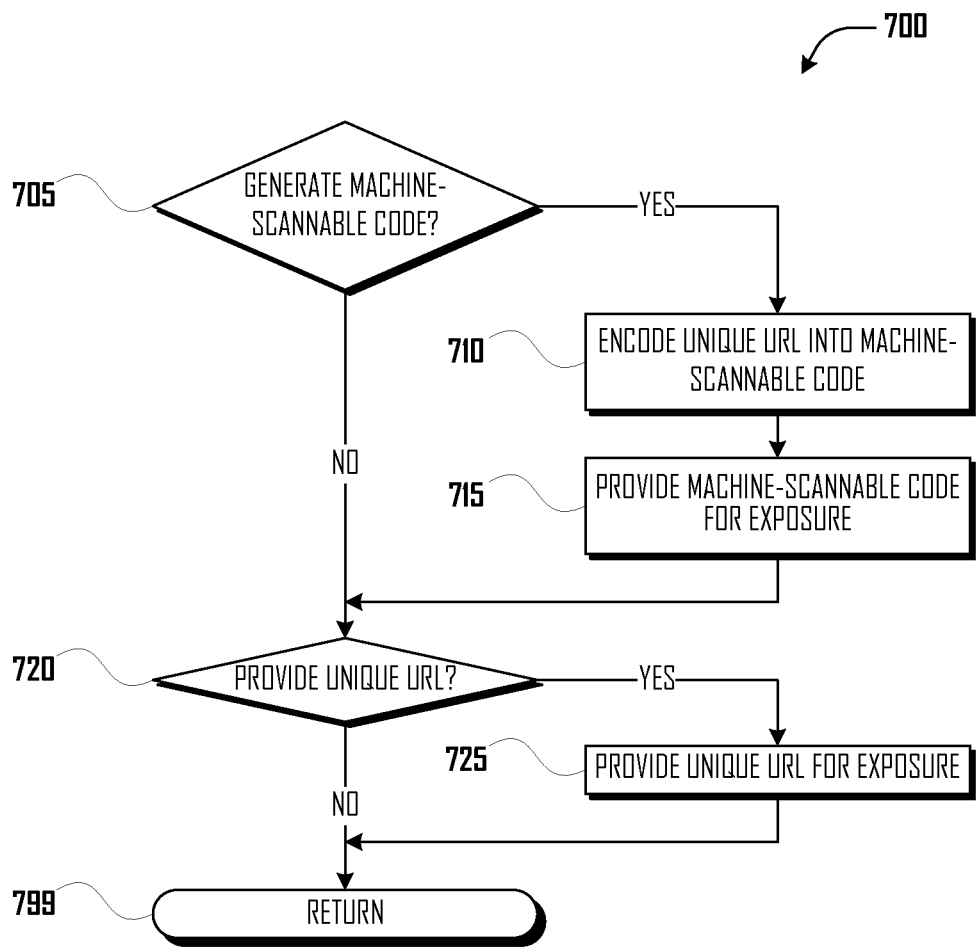
FIG. 7 illustrates an exemplary unique URL exposure subroutine, in accordance with one embodiment.

FIG. 7 illustrates an exemplary unique URL exposure subroutine 700, in accordance with one embodiment. In decision block 705, subroutine 700 determines whether to generate a machine-scannable code. In some embodiments, such as those in which the machine-scannable code is a two-dimensional barcode, subroutine 700 may encode the unique URL into the machine-scannable code in block 710 and provide the generated machine-scannable code for exposure to a plurality of mobile devices in block 715. For example, in one embodiment, subroutine 700 may encode the unique URL into a two-dimensional barcode and send an image of the barcode to a remote device (e.g., publisher 110) for printing into printed publications, embedding into electronic documents, and the like, which publications and/or electronic documents may be subsequently exposed to a plurality of mobile devices of differing device types. However, in other embodiments, subroutine 700 may determine not to generate a machine-scannable code, leaving this task to a remote device (e.g., publisher 110).

In decision block 720, subroutine 700 determines whether to provide the unique URL. In some embodiments, such as those in which subroutine 700 has generated and provided the machine-scannable code in block 710-715, subroutine 700 may not need to also provide the unique URI. In other embodiments, including those in which subroutine 700 determined not to generate a machine-scannable code in block 705, subroutine 700 may in block 725 provide the unique URL to a remote device (e.g., publisher 110) for encoding into a machine-scannable code and subsequent exposure to a plurality of mobile devices of differing device types. Subroutine 700 ends in block 799.

Referring again to FIG. 5, beginning in starting loop block 530, routine 500 processes an ongoing series of requests for the unique URL from mobile devices of differing device types, the mobile devices having obtained the unique URL by scanning manifestations of a machine-scannable code to which the mobile devices were exposed. For example, in various embodiments, the mobile devices may have been exposed to printed publications or rendered electronic documents including images of a two-dimensional barcode encoded with the unique URL, articles of manufacture with affixed RFID tags encoded with the unique URL, and the like.

In subroutine block 800 (see FIG. 8, discussed below), routine 500 processes the current request for the unique URL from the current requesting mobile device.

From time to time, routine 500 may obtain information about a new mobile device type that was not previously known at the time the unique URL was generated and associated with the actionable data payload. In decision block 535, routine 500 determines whether any such new device information has been obtained. If not, in block 540 routine 500 iterates back to block 530 to process the next request for the unique URL (if any). If information about one or more new mobile devices has been obtained, then in subroutine block 600 (see discussion of FIG. 6, above), routine 500 creates new device/payload mappings for each new combination of mobile device type and payload type, then in block 540, iterates back to block 530 to process the next request for the unique URL (if any). After all requests for the unique URL have been processed, routine 500 ends in block 599.

Figure 8:
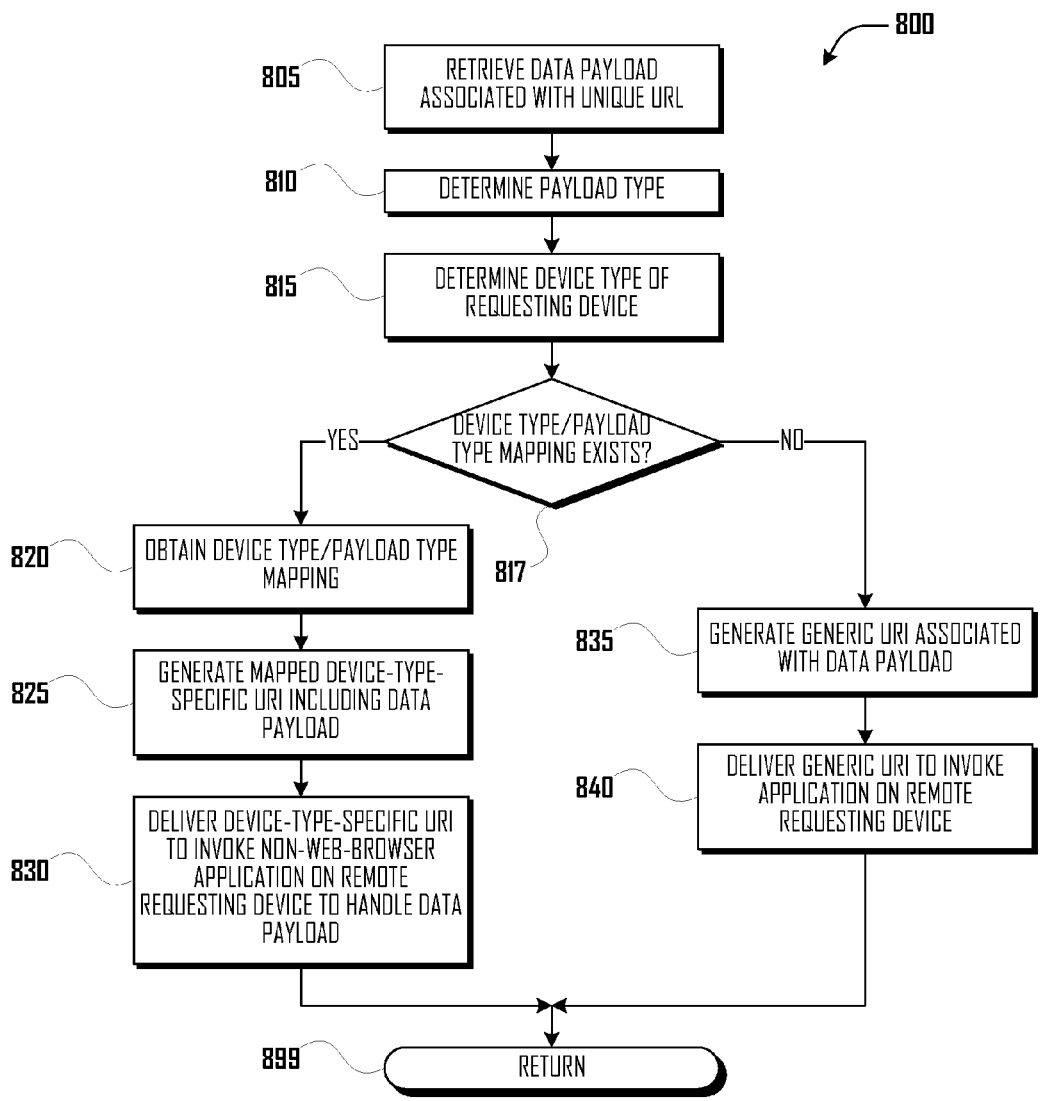
FIG. 8 illustrates an exemplary unique-URL-request processing subroutine, in accordance with one embodiment.

FIG. 8 illustrates an exemplary unique-URL-request processing subroutine 800, in accordance with one embodiment. In block 805, subroutine 800 retrieves (e.g., by querying database 115 according to the unique URL) the actionable data payload associated with the unique URL. In block 810, subroutine 800 determines which of the plurality of different payload types corresponds to the actionable data payload associated with the unique URL.

In block 815, subroutine 800 determines a device type of the mobile device that issued the request currently being processed. For example, in one embodiment, the request for the unique URL from the mobile device may include an implicit indication of the client type (e.g., a client hardware and/or software type may be indicated via an HTTP referrer header or other metadata incident to the request). In other embodiments, determining a device type of the requesting mobile device may include additional communications with the mobile device.

In decision block 817, subroutine 800 determines whether the determined device type of the requesting mobile device is known and a device-type/payload-type mapping exists. If so, in block 820, subroutine 800 obtains the mapping corresponding to the determined device type of the requesting mobile device and the determined payload type of the actionable data payload associated with the requested unique URL.

In block 825, subroutine 800 generates a device-type-specific URI including the actionable data payload. The URI is formatted so that the requesting mobile device will be able to interpret and act on the data payload by invoking a suitable non-web-browser application.

In block 830, subroutine 800 delivers the device-type-specific URI to the requesting mobile device, where a URI handling routine will invoke a non-web-browser application to handle the actionable data payload included in the device-type-specific URI. For example, depending on the payload type, the requesting mobile device may act on the actionable data payload by adding (or prompting to add) a contact to a contacts list, adding (or prompting to add) an event or appointment to a calendar or event list, opening a mapping application to a geo-location, downloading (or prompting to download) downloadable content from a store or other content-downloading application, and the like.

On the other hand, if in decision block 817, subroutine 800 determines that the determined device type of the requesting mobile device is not known and/or that a device-type/payload-type mapping does not exist, then in block 835, subroutine 800 may generate a generic URI according to the data payload type and in block 840, deliver the generic URI to the requesting mobile device. For example, in one embodiment, for a geo-location-type payload, subroutine 800 may generate an image of a map targeting a particular geo-location and deliver a URI of the image to the requesting mobile device to be handled by a web browser or other image-handling application. For another example, in one embodiment, for an event or appointment payload, subroutine 800 may generate a web page including event or appointment details, and deliver the URI of the web page to the requesting mobile device to be handled by a web browser. Similarly, in one embodiment, for contact information payload, subroutine 800 may generate a web page including contact details, and deliver the URI of the web page to the requesting mobile device to be handled by a web browser.

Subroutine 800 ends in block 899.

Figure 9:
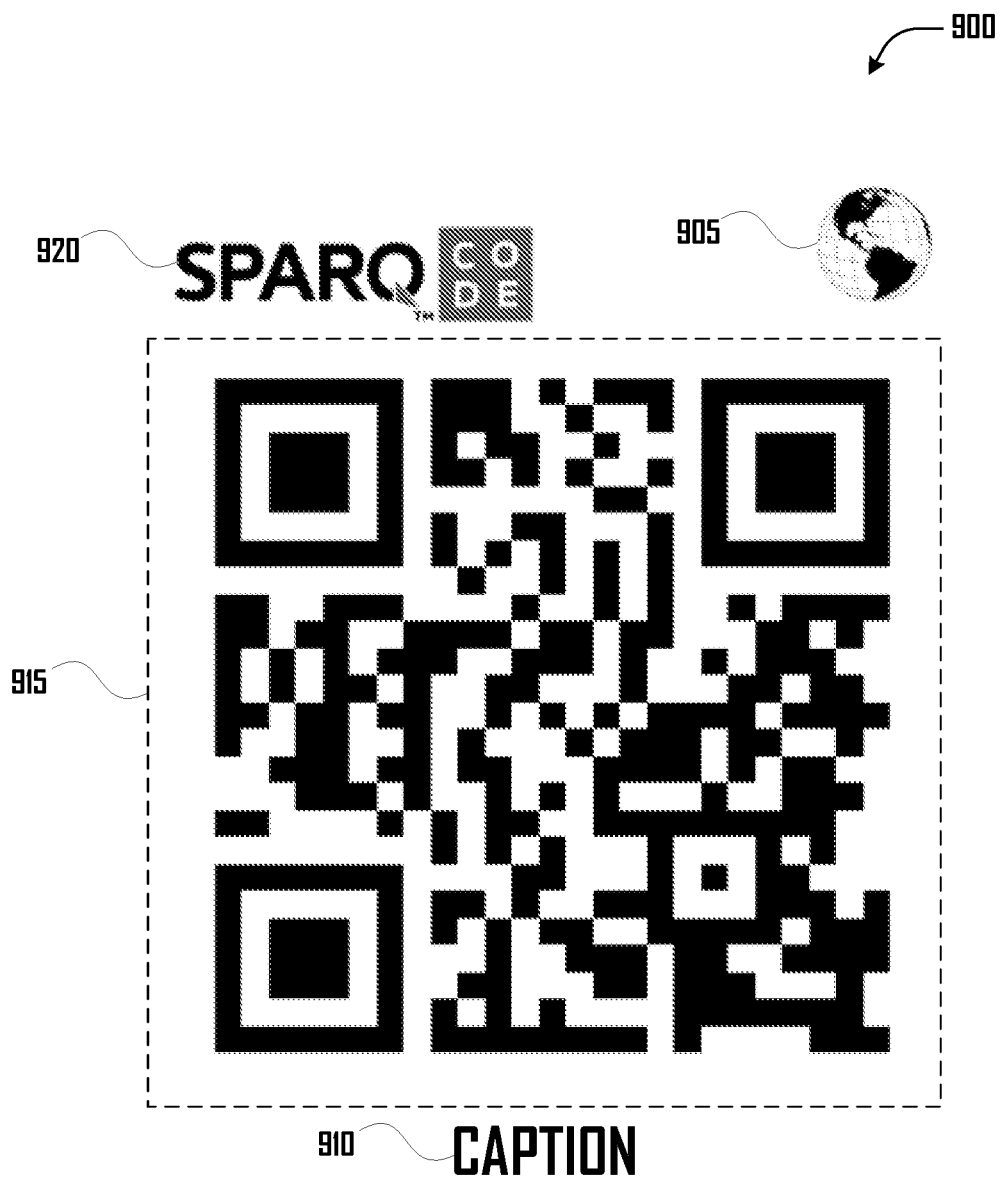
FIG. 9 illustrates a SPARQCode™ two-dimensional barcode, such as may be employed as a machine-scannable code in various embodiments.

FIG. 9 illustrates a SPARQCode™ two-dimensional barcode 900, such as may be employed as a machine-scannable code in various embodiments. Two-dimensional barcode 900 follows the SPARQCode™ encoding standard, which was developed by the assignee of the present application. Per the SPARQCode™ encoding standard, barcode 900 includes several components:

- a source-identifier 920;
- a non-machine-readable pictogram 905 indicating a payload type of the actionable data payload associated with barcode 900;
- a caption 910, providing brief human-readable information about the data payload associated with barcode 900; and
- a QR Code 915 encoded with a unique URL associated with a data payload.

QR Code 915 encodes the unique URL as a binary data stream according to standards defined by DENSO Corporation (of Kariya, Aichi, Japan) in ISO/IEC 18004. However, ISO/IEC 18004 lacks an encoding standard for interpreting the data stream on the application layer for decoding various data payload types, as discussed herein. The SPARQCode™ encoding standard specifies common formats for the interpretation of different data payload types at the application layer.

In the illustrated embodiment, non-machine-readable pictogram 905 indicates that the geo-location or map data is the payload type of the actionable data payload associated with the unique URL encoded in QR Code 915. The SPARQCode™ standard specifies additional pictograms indicating various other actionable data payload types, including contact information, appointment or event information, web address information, raw data, and the like.

Figure 10:
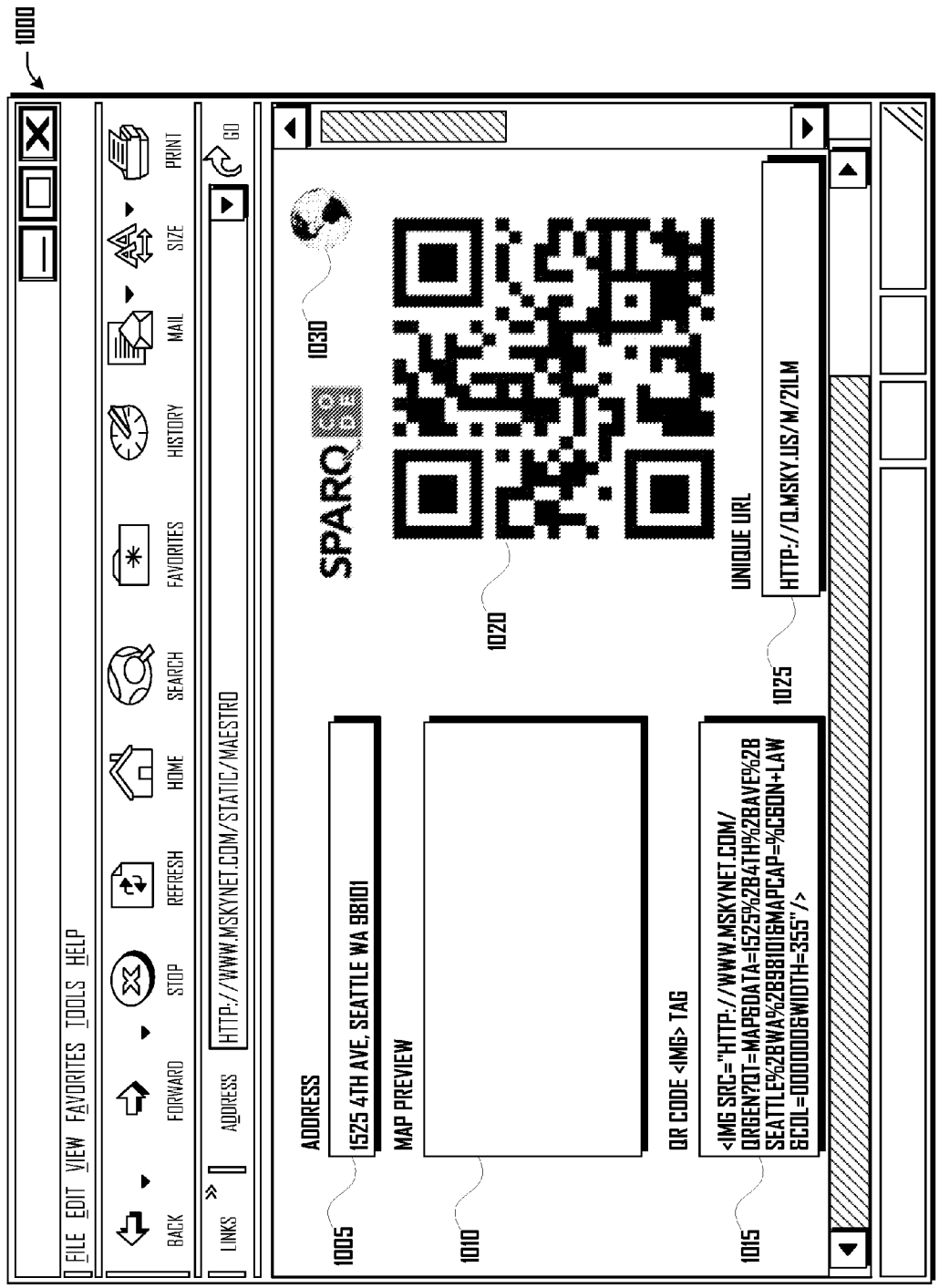
FIG. 10 illustrates a web application, such as may be provided by application invocation server, for handling a geo-location payload.
Figure 11:
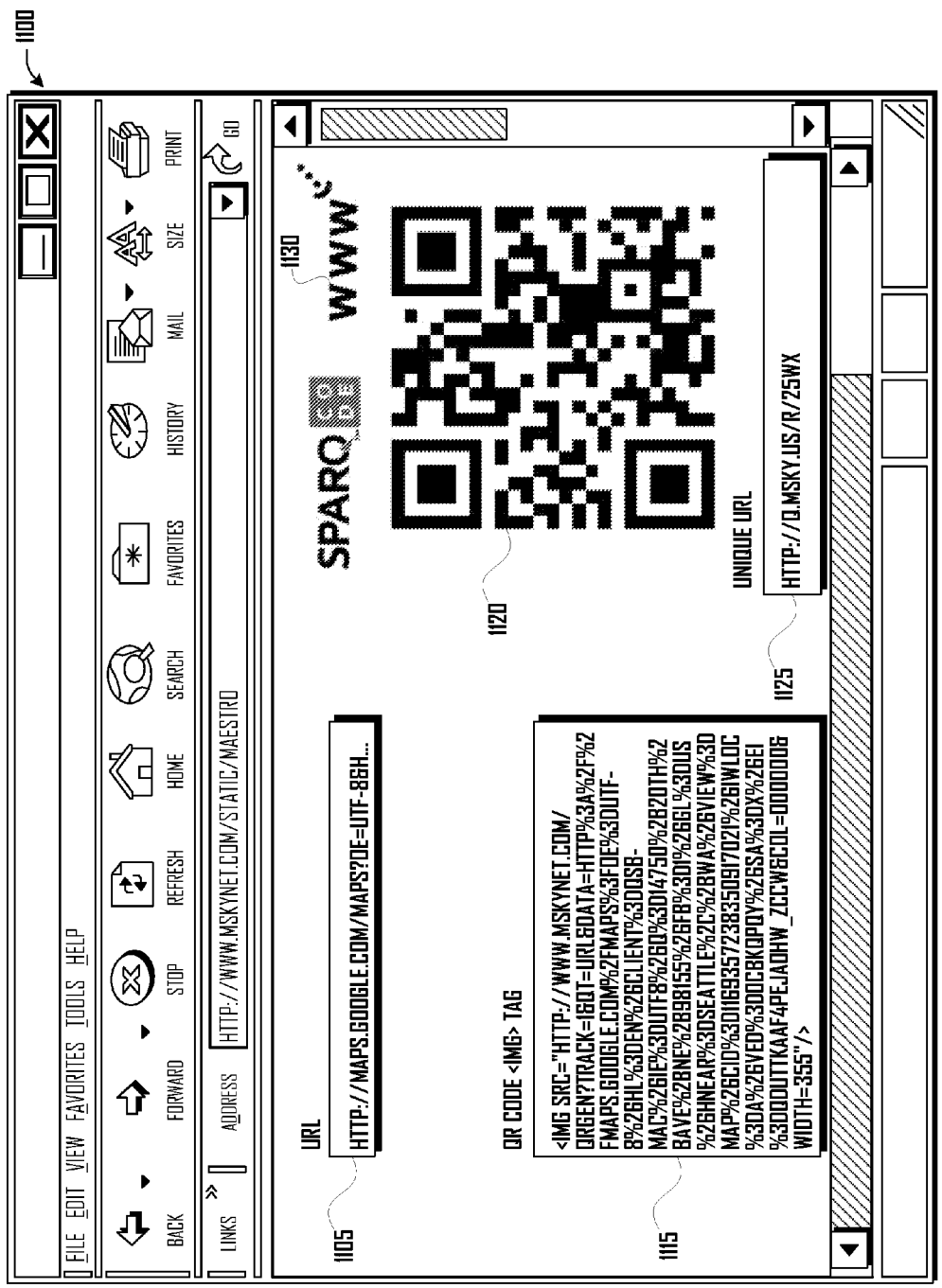
FIG. 11 illustrates a web application, such as may be provided by application invocation server, for handling a URL payload.
Figure 12:
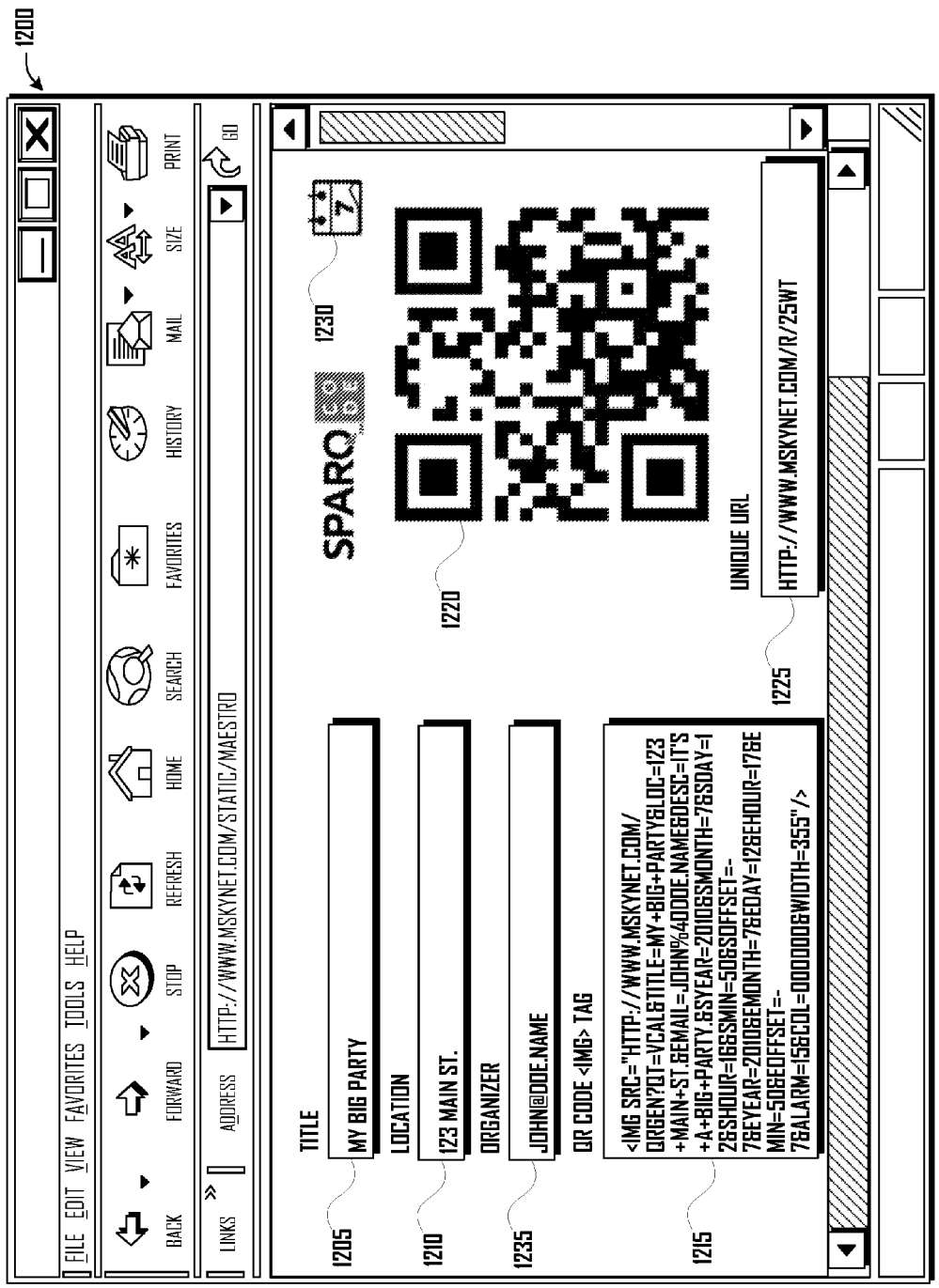
FIG. 12 illustrates a web application, such as may be provided by application invocation server, for handling an event or appointment payload.

FIGS. 10-12 illustrate exemplary interfaces 1000, 1100, 1200, such as may be used to obtain actionable data payloads (e.g. from publisher 110 to application invocation server 200) and provide machine-scannable codes and/or unique URLs (e.g. from application invocation server 200 to publisher 110) for subsequent exposure to mobile devices of differing device types, in accordance with various embodiments.

FIG. 10 illustrates a web application 1000, such as may be provided by application invocation server 200, for handling a geo-location payload. A user (e.g. a user of publisher device 110) provides an address 1005 (or otherwise specifies a geo-location) as an actionable payload. In other embodiments, web application 1000 may allow for entry of additional payload data (not shown), such as captions, map labels, directions, and the like. In response to payload input, the web application provider automatically, dynamically generates and provides to the user a unique URL 1025 associated with the payload, a two-dimensional barcode 1020 (including a non-machine-readable, payload-type-indicative pictogram 1030), an embeddable URL to an image corresponding to two-dimensional barcode 1020, and a preview 1010 of the geo-location on a map.

FIG. 11 illustrates a web application 1100, such as may be provided by application invocation server 200, for handling a URL payload. A user (e.g. a user of publisher device 110) provides a URL 1105 as an actionable payload (on some devices, notable iOS/iPhone OS devices, certain URLs may be handled by non-web-browser applications). In other embodiments, web application 1100 may allow for entry of additional payload data (not shown), such as captions and the like. In response to payload input, the web application provider automatically, dynamically generates and provides to the user a unique URL 1125 associated with the payload, a two-dimensional barcode 1120 (including a non-machine-readable, payload-type-indicative pictogram 1130), and an embeddable URL to an image corresponding to two-dimensional barcode 1120.

FIG. 12 illustrates a web application 1200, such as may be provided by application invocation server 200, for handling an event or appointment payload. A user (e.g. a user of publisher device 120) provides an actionable payload, including a title 1205, location 1210, organizer 1235. In other embodiments, web application 1200 may allow for entry of additional payload data (not shown), such as captions, start and/or stop times, alarms, directions, and the like. In response to payload input, the web application provider automatically, dynamically generates and provides to the user a unique URL 1225 associated with the payload, a two-dimensional barcode 1220 (including a non-machine-readable, payload-type-indicative pictogram 1230), and an embeddable URL to an image corresponding to two-dimensional barcode 1220.

Tables 1-5, below, illustrate unique URLs and device-type-specific URIs for an exemplary geo-location payload type and an exemplary event/appointment payload type according to various embodiments.

For example, in one embodiment, an exemplary geo-location data payload (here, referring to the Pike Place Market in Seattle, Wash.) may be associated with an exemplary unique URL (e.g., "http://q.msky.us/m/267S"), which may be mapped to device-type-specific URIs as set out in Table 1, below.

TABLE 1

| Device type | device-type-specific URI |
| --- | --- |
| iPhone | http://maps.google.com/maps?q=Pike%20Place%20Market,%20Seattle,%20WA,%20USA%28pike+place+market+seattle%29 |
| Android | geo:0,0?q=Pike Place Market, Seattle, WA, USA(pike+place+market+seattle) |
| webOS | http://maps.google.com/maps/m?q=Pike+Place+Market,+Seattle,+WA,+USA%28pike+place+market+seattle%29 |

To handle the device-type-specific URIs listed in Table 1, a requesting device of one of the device types set out in Table 1 would invoke a local mapping application to handle the indicated device-type-specific URI.

However, in alternate embodiments, other device types may not allow for invocation of a local mapping application on the requesting device. For example, in one embodiment set out in Table 2, for certain device types, a device-type-specific URI may resolve to a dynamically-generated image of a map showing the geo-location specified by the data payload.

TABLE 2

| Device type | device-type-specific URI |
| --- | --- |
| Windows Mobile; Symbian OS; Blackberry | http://q.msky.us/cgi-bin/map_tre.cgi?zoom=14&maptype=mobile&center=47.6101359,-122.3420567&markers=47.6101359,-122.3420567,blueg&cap=pike%2Bplace%2Bmarket%2Bseattle&size=350×280 |

For another example, in one embodiment, an exemplary calendar-event data payload (here, referring to an event celebrating the 58th Birthday of the Barcode) associated with an exemplary unique URL (e.g., "http://www.mskynet.com/r/MNN") may be mapped to device-type-specific URIs as set out in Table 3, below.

TABLE 3

| Device type | device-type-specific URI |
|---|---|
| iPhone/iOS | webcal://www.mskynet.com/vcal/generate?alarm=15&desc=Barcode%27s+58th+Birthday%21&end=2010-10-07T21%3A30%3A00%2B00%3A00&format=ics&from=noreply%40mskynet.com&loc=Seattle%2C+WA&start=2010-10-07T20%3A30%3A00%2B00%3A00&title=Birthday |
| Windows Mobile | http://www.mskynet.com/vcal/generate?alarm=15&desc=Barcode%27s+58th+Birthday%21&end=2010-10-07T21%3A30%3A00%2B00%3A00&format=vcs&from=noreply%40mskynet.com&loc=Seattle%2C+WA&start=2010-10-07T20%3A30%3A00%2B00%3A00&title=Birthday |
| Symbian OS | http://www.mskynet.com/vcal/generate?alarm=15&desc=Barcode%27s+58th+Birthday%21&end=2010-10-07T21%3A30%3A00%2B00%3A00&format=vcs&from=noreply%40mskynet.com&loc=Seattle%2C+WA&mobile=symbian&start=2010-10-07T20%3A30%3A00%2B00%3A00&title=Birthday |

To handle the device-type-specific URIs listed in Table 3, a requesting device of one of the device types set out in Table 3 would make a request to the indicated device-type-specific URI and invoke a local calendaring application to handle the resultant iCalendar data (see Table 5, discussed below).

However, in alternate embodiments involving other device types, a local calendaring application may be invoked indirectly, such as by emailing iCalendar data to an email address associated with the requesting device. Consequently, the device-type-specific URIs set forth in Table 4, below, may resolve to a web page that prompts for an email address to which iCalendar data would then be emailed, subsequently invoking a local calendaring application on the receiving device.

TABLE 4

| Device type | device-type-specific URI |
|---|---|
| Blackberry | http://www.mskynet.com/vcal/email?alarm=15&desc=Barcode%27s+58th+Birthday!&end=2010-10-07T21%3A30%3A00%2B00%3A00&from=noreply%40mskynet.com&loc=Seattle%2C+WA&mobile=blackberry&start=2010-10-07T20%3A30%3A00%2B00%3A00&title=Birthday&vcal_format=ics |
| Android | http://www.mskynet.com/vcal/email?alarm=15&desc=Barcode%27s+58th+Birthday!&end=2010-10-07T21%3A30%3A00%2B00%3A00&from=noreply%40mskynet.com&loc=Seattle%2C+WA&mobile=andriod&start=2010-10-07T20%3A30%3A00%2B00%3A00&title=Birthday&vcal_format=ics |
| webOS | http://www.mskynet.com/vcal/email?alarm=15&desc=Barcode%27s+58th+Birthday!&email=yowhan%40gmail.com&end=2010-10-07T21%3A30%3A00%2B00%3A00&from=noreply%40mskynet.com&loc=Seattle%2C+WA&mobile=palm&start=2010-10-07T20%3A30%3A00%2B00%3A00&title=Birthday&vcal_format=ics |

Table 5 shows various device-type-specific iCalendar payloads that may be delivered to requesting devices of various types according to the device-type-specific URIs set out in Table 3 and Table 4. The various iCalendar data payloads set out in Table 5 would ultimately be handled by a local calendaring application on the requesting device of the indicated type.

TABLE 5

| Device type | device-type-specific iCalendar data |
|---|---|
| iPhone/iOS; Android; webOS | BEGIN:VCALENDAR<br>METHOD:PUBLISH<br>PRODID:-//MSKYNET, Inc.//EN<br>VERSION:2.0<br>X-WR-CALNAME:Birthday<br>CALSCALE:GREGORIAN<br>BEGIN:VEVENT<br>DTSTART:20101007T203000Z<br>DTEND:20101007T213000Z<br>DTSTAMP:20100715T054408Z<br>ORGANIZER;CN=:MAILTO:noreply@mskynet.com<br>CLASS:PUBLIC<br>CREATED:20100715T054408Z<br>SUMMARY:Birthday<br>DESCRIPTION:Barcode's 58th Birthday!<br>LAST-MODIFIED:20100715T054408Z<br>LOCATION:Seattle, WA<br>SEQUENCE:0<br>TRANSP:OPAQUE<br>BEGIN:VALARM<br>ACTION:DISPLAY<br>TRIGGER:-PT15M<br>END:VALARM<br>END:VEVENT<br>END:VCALENDAR |
| Blackberry | BEGIN:VCALENDAR<br>METHOD:REQUEST<br>PRODID:-//MSKYNET, Inc.//EN<br>VERSION:2.0<br>X-WR-CALNAME:Birthday<br>CALSCALE:GREGORIAN<br>BEGIN:VEVENT<br>DTSTART:20101007T203000Z<br>DTEND:20101007T213000Z<br>DTSTAMP:20100715T062837Z<br>ORGANIZER;CN=:MAILTO:noreply@mskynet.com<br>CLASS:PUBLIC<br>CREATED:20100715T062837Z<br>SUMMARY:Birthday<br>DESCRIPTION:Barcode's 58th Birthday!<br>LAST-MODIFIED:20100715T062837Z<br>LOCATION:Seattle, WA<br>SEQUENCE:0<br>TRANSP:OPAQUE<br>BEGIN:VALARM<br>ACTION:DISPLAY<br>TRIGGER:-PT15M<br>END:VALARM<br>END:VEVENT<br>END:VCALENDAR |
| Symbian | BEGIN:VCALENDAR<br>METHOD:PUBLISH<br>PRODID:-//MSKYNET, Inc.//EN<br>VERSION:1.0<br>X-WR-CALNAME:Birthday<br>CALSCALE:GREGORIAN<br>BEGIN:VEVENT<br>DTSTART:20101007T203000Z<br>DTEND:20101007T213000Z<br>DTSTAMP:20100715T063717Z<br>ORGANIZER;CN=:MAILTO:noreply@mskynet.com<br>CLASS:PUBLIC<br>CREATED:20100715T063717Z<br>SUMMARY:Birthday<br>DESCRIPTION:Barcode's 58th Birthday!<br>LAST-MODIFIED:20100715T063717Z<br>LOCATION:Seattle, WA<br>SEQUENCE:0<br>TRANSP:OPAQUE<br>END:VEVENT<br>END:VCALENDAR |
| Windows Mobile | BEGIN:VCALENDAR<br>METHOD:PUBLISH<br>PRODID:-//MSKYNET, Inc.//EN<br>VERSION:2.0<br>X-WR-CALNAME:Birthday<br>CALSCALE:GREGORIAN<br>BEGIN:VEVENT |

TABLE 5-continued

| Device type | device-type-specific iCalendar data |
|---|---|
| | DTSTART:20101007T203000Z<br>DTEND:20101007T213000Z<br>DTSTAMP:20100715T055225Z<br>ORGANIZER;CN=:MAILTO:noreply@mskynet.com<br>CLASS:PUBLIC<br>CREATED:20100715T055225Z<br>SUMMARY:Birthday<br>DESCRIPTION:Barcode's 58th Birthday!<br>LAST-MODIFIED:20100715T055225Z<br>LOCATION:Seattle, WA<br>SEQUENCE:0<br>TRANSP:OPAQUE<br>BEGIN:VALARM<br>ACTION:DISPLAY<br>TRIGGER:-PT15M<br>END:VALARM<br>END:VEVENT<br>END:VCALENDAR |

Although Tables 3-5 refer to an exemplary event payload delivered in the iCalendar data format, in other embodiments, the methods disclosed herein may be similarly adapted to other payload data types and data delivery formats.

Although specific embodiments have been illustrated and described herein, it will be appreciated by those of ordinary skill in the art that alternate and/or equivalent implementations may be substituted for the specific embodiments shown and described without departing from the scope of the present disclosure. This application is intended to cover any adaptations or variations of the embodiments discussed herein.

The invention claimed is:

1. A server-implemented method of remotely invoking applications on mobile devices of a plurality of mobile-device types, the method comprising:
   creating a mapping, by the server, between each of a plurality of data payload types and each of the plurality of mobile-device types, each mapping comprising a non-http URI scheme corresponding to a non-web-browser application suitable for handling the mapped data payload type on the mapped one of the plurality of mobile-device types;
   storing in a database a data payload of one of said plurality of data payload types;
   generating, by the server, a unique URL corresponding to said data payload;
   associating, by the server, said data payload with said unique URL in said database;
   providing, by the server, said unique URL for exposure, via a machine-scannable code, to a plurality of mobile devices of the plurality of mobile-device types;
   receiving a first request for said unique URL from a first requesting mobile device of a first one of the plurality of mobile-device types, said first requesting mobile device having obtained said unique URL by scanning a manifestation of said machine-scannable code;
   determining, by the server, a data payload type of said data payload corresponding to said unique URL;
   obtaining, by the server, a first mapping corresponding to said data payload type and said first one of the plurality of mobile-device types;
   generating, by the server according to said first mapping, a first device-type-specific URI comprising said data payload formatted for said first one of the plurality of mobile-device types;
   delivering, by the server, said first device-type-specific URI to said first requesting mobile device to invoke a first non-web-browser application suitable for handling said data payload on said first requesting mobile device;
   receiving a second request for said unique URL from a second requesting mobile device of a second one of the plurality of mobile-device types, said second requesting mobile device having obtained said unique URL by scanning a manifestation of said machine-scannable code;
   obtaining, by the server, a second mapping corresponding to said data payload type and said second one of the plurality of mobile-device types;
   generating, by the server according to said second mapping, a second device-type-specific URI comprising said data payload formatted for said second one of the plurality of mobile-device types;
   delivering, by the server, said second device-type-specific URI to said second requesting mobile device to invoke a second non-web-browser application suitable for handling said data payload on said second requesting mobile device;
   wherein said second device-type-specific URI differs from said first device-type-specific URI, and said second non-web-browser application differs from said first non-web-browser application.

2. The method of claim 1, wherein providing said unique URL for exposure to said plurality of mobile devices comprises:
   encoding, by the server, said unique URL into said machine-scannable code; and
   providing said machine-scannable code for exposure to said plurality of mobile devices of the plurality of mobile-device.

3. The method of claim 2, wherein said machine-scannable code comprises an optical barcode.

4. The method of claim 1, wherein said machine-scannable code is exposed to said plurality of mobile devices via a plurality of radio-frequency identification ("RFID") tags.

5. The method of claim 1, further comprising, after storing said data payload and providing said unique URL:
   creating a new mapping between each of said plurality of data payload types and a previously-unknown mobile device type, said new mapping including a previously-unknown non-http URI scheme corresponding to a previously-unknown non-web-browser application suitable for handling the mapped data payload type on said previously-unknown mobile device type;
   receiving a request for said unique URL from a third requesting mobile device of said previously-unknown mobile device type, said requesting mobile device having obtained said unique URL by scanning a manifestation of said machine-scannable code;
   generating, according to said new mapping, a third device-type-specific URI comprising said data payload formatted for said previously-unknown mobile device type;
   delivering said third device-type-specific URI to said third requesting mobile device to invoke said previously-unknown non-web-browser application for handling the mapped data payload type.

6. The method of claim 1, wherein said data payload comprises at least one of an event information data structure, a contact information data structure, and a geo-location data structure.

7. The method of claim 1, wherein said data payload comprises at least 1 kilobyte of information, and wherein said unique URL encoded into said optical machine-readable code comprises no more than 200 bytes of information.

8. The method of claim 1, wherein said dynamically-generated image depicting said optical machine-readable code further depicts a non-machine-readable pictogram indicating said one of said plurality of data payload types.

9. A server apparatus comprising a processor and a memory, the memory including instructions that when executed by the processor, configure the server apparatus to remotely invoke applications on mobile devices of a plurality of mobile-device types according to a method comprising:
creating a mapping between each of a plurality of data payload types and each of the plurality of mobile-device types, each mapping comprising a non-http URI scheme corresponding to a non-web-browser application suitable for handling the mapped data payload type on the mapped one of the plurality of mobile-device types;
storing in a database a data payload of one of said plurality of data payload types;
generating a unique URL corresponding to said data payload;
associating said data payload with said unique URL in said database;
providing said unique URL for exposure, via a machine-scannable code, to a plurality of mobile devices of the plurality of mobile-device types;
receiving a first request for said unique URL from a first requesting mobile device of a first one of the plurality of mobile-device types, said first requesting mobile device having obtained said unique URL by scanning a manifestation of said machine-scannable code;
determining a data payload type of said data payload corresponding to said unique URL;
obtaining a first mapping corresponding to said data payload type and said first one of the plurality of mobile-device types;
generating, by the server according to said first mapping, a first device-type-specific URI comprising said data payload formatted for said first one of the plurality of mobile-device types;
delivering said first device-type-specific URI to said first requesting mobile device to invoke a first non-web-browser application suitable for handling said data payload on said first requesting mobile device;
receiving a second request for said unique URL from a second requesting mobile device of a second one of the plurality of mobile-device types, said second requesting mobile device having obtained said unique URL by scanning a manifestation of said machine-scannable code;
obtaining a second mapping corresponding to said data payload type and said second one of the plurality of mobile-device types;
generating, by the server according to said second mapping, a second device-type-specific URI comprising said data payload formatted for said second one of the plurality of mobile-device types;
delivering said second device-type-specific URI to said second requesting mobile device to invoke a second non-web-browser application suitable for handling said data payload on said second requesting mobile device;
wherein said second device-type-specific URI differs from said first device-type-specific URI, and said second non-web-browser application differs from said first non-web-browser application.

10. The server apparatus of claim 9, wherein providing said unique URL for exposure to said plurality of mobile devices comprises:
encoding said unique URL into said machine-scannable code; and
providing said machine-scannable code for exposure to said plurality of mobile devices of the plurality of mobile-device.

11. The server apparatus of claim 10, wherein said machine-scannable code comprises an optical barcode.

12. The server apparatus of claim 9, wherein said machine-scannable code is exposed to said plurality of mobile devices via a plurality of radio-frequency identification ("RFID") tags.

13. The server apparatus of claim 9, wherein the method further comprises, after storing said data payload and providing said unique URL:
creating a new mapping between each of said plurality of data payload types and a previously-unknown mobile device type, said new mapping including a previously-unknown non-http URI scheme corresponding to a previously-unknown non-web-browser application suitable for handling the mapped data payload type on said previously-unknown mobile device type;
receiving a request for said unique URL from a third requesting mobile device of said previously-unknown mobile device type, said requesting mobile device having obtained said unique URL by scanning a manifestation of said machine-scannable code;
generating, according to said new mapping, a third device-type-specific URI comprising said data payload formatted for said previously-unknown mobile device type;
delivering said third device-type-specific URI to said third requesting mobile device to invoke said previously-unknown non-web-browser application for handling the mapped data payload type.

14. A non-transitory computer-readable storage medium storing instructions that when executed by a processor, configure the processor to remotely invoke applications on mobile devices of a plurality of mobile-device types according to a method comprising:
creating a mapping between each of a plurality of data payload types and each of the plurality of mobile-device types, each mapping comprising a non-http URI scheme corresponding to a non-web-browser application suitable for handling the mapped data payload type on the mapped one of the plurality of mobile-device types;
storing in a database a data payload of one of said plurality of data payload types;
generating a unique URL corresponding to said data payload;
associating said data payload with said unique URL in said database;
providing said unique URL for exposure, via a machine-scannable code, to a plurality of mobile devices of the plurality of mobile-device types;
receiving a first request for said unique URL from a first requesting mobile device of a first one of the plurality of mobile-device types, said first requesting mobile device having obtained said unique URL by scanning a manifestation of said machine-scannable code;
determining a data payload type of said data payload corresponding to said unique URL;
obtaining a first mapping corresponding to said data payload type and said first one of the plurality of mobile-device types;
generating, by the server according to said first mapping, a first device-type-specific URI comprising said data payload formatted for said first one of the plurality of mobile-device types;

delivering said first device-type-specific URI to said first requesting mobile device to invoke a first non-web-browser application suitable for handling said data payload on said first requesting mobile device;

receiving a second request for said unique URL from a second requesting mobile device of a second one of the plurality of mobile-device types, said second requesting mobile device having obtained said unique URL by scanning a manifestation of said machine-scannable code;

obtaining a second mapping corresponding to said data payload type and said second one of the plurality of mobile-device types;

generating, by the server according to said second mapping, a second device-type-specific URI comprising said data payload formatted for said second one of the plurality of mobile-device types;

delivering said second device-type-specific URI to said second requesting mobile device to invoke a second non-web-browser application suitable for handling said data payload on said second requesting mobile device;

wherein said second device-type-specific URI differs from said first device-type-specific URI, and said second non-web-browser application differs from said first non-web-browser application.

15. The computer-readable storage medium of claim 14, wherein providing said unique URL for exposure to said plurality of mobile devices comprises:

encoding said unique URL into said machine-scannable code; and providing said machine-scannable code for exposure to said plurality of mobile devices of the plurality of mobile-device.

16. The computer-readable storage medium of claim 15, wherein said machine-scannable code comprises an optical barcode.

17. The computer-readable storage medium of claim 14, wherein said machine-scannable code is exposed to said plurality of mobile devices via a plurality of radio-frequency identification ("RFID") tags.

18. The computer-readable storage medium of claim 14, wherein the method further comprises, after storing said data payload and providing said unique URL:

creating a new mapping between each of said plurality of data payload types and a previously-unknown mobile device type, said new mapping including a previously-unknown non-http URI scheme corresponding to a previously-unknown non-web-browser application suitable for handling the mapped data payload type on said previously-unknown mobile device type;

receiving a request for said unique URL from a third requesting mobile device of said previously-unknown mobile device type, said requesting mobile device having obtained said unique URL by scanning a manifestation of said machine-scannable code;

generating, according to said new mapping, a third device-type-specific URI comprising said data payload formatted for said previously-unknown mobile device type;

delivering said third device-type-specific URI to said third requesting mobile device to invoke said previously-unknown non-web-browser application for handling the mapped data payload type.

\* \* \* \* \*